(12) United States Patent
Tagami

(10) Patent No.: US 12,479,976 B2
(45) Date of Patent: Nov. 25, 2025

(54) CURED PRODUCT, OPTICAL ELEMENT, OPTICAL APPARATUS, AND IMAGING APPARATUS

(71) Applicant: CANON KABUSHIKI KAISHA, Tokyo (JP)

(72) Inventor: Kei Tagami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 18/151,247

(22) Filed: Jan. 6, 2023

(65) Prior Publication Data

US 2023/0220183 A1 Jul. 13, 2023

(30) Foreign Application Priority Data

Jan. 11, 2022 (JP) .................. 2022-002279

(51) Int. Cl.
| | |
|---|---|
| G02B 1/04 | (2006.01) |
| C07C 219/32 | (2006.01) |
| C08F 220/20 | (2006.01) |
| C08F 222/10 | (2006.01) |
| C08K 5/18 | (2006.01) |

(52) U.S. Cl.
CPC .............. *C08K 5/18* (2013.01); *C08F 220/20* (2013.01); *C08F 222/102* (2020.02); *G02B 1/041* (2013.01)

(58) Field of Classification Search
CPC . C07C 2603/18; C07C 211/26; C07C 211/00; C07C 219/32; C08K 5/18
See application file for complete search history.

(56) References Cited

U.S. PATENT DOCUMENTS

2015/0179953 A1 6/2015 Mujica-Fernaud et al.
2020/0012014 A1* 1/2020 Tagami ................ C07C 217/76

FOREIGN PATENT DOCUMENTS

| JP | H05125023 | A | | 5/1993 |
|---|---|---|---|---|
| JP | 2000178237 | A | | 6/2000 |
| JP | 2004059743 | A | * | 2/2004 |
| JP | 2005120030 | A | | 5/2005 |
| JP | 2010062442 | A | | 3/2010 |
| JP | 2018165355 | A | | 10/2018 |

* cited by examiner

*Primary Examiner* — Amy C Bonaparte
*Assistant Examiner* — Frank S. Hou
(74) *Attorney, Agent, or Firm* — Canon U.S.A., Inc. IP Division

(57) ABSTRACT

A cured product of a resin composition. The resin composition comprises a compound represented by the following formula (1):

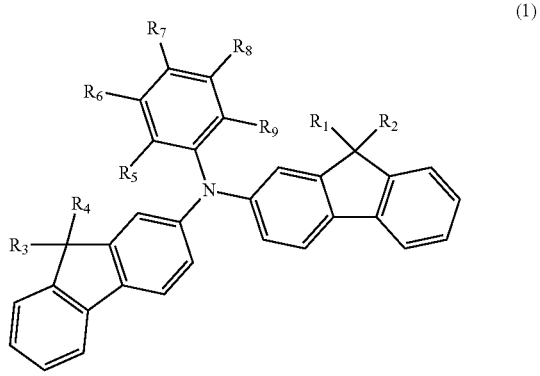

(1)

$R_1$ to $R_4$ are each independently selected from a polymerizable functional group, a substituted or unsubstituted alkyl group, a substituted or unsubstituted alkyl group having a polymerizable functional group at a terminal thereof which may contain an oxygen or sulfur atom replacing one $CH_2$ in a main chain of the alkyl group. $R_5$ to $R_9$ are each independently selected from a hydrogen atom and a trifluoromethyl group. However, at least one of $R_1$ to $R_4$ is a polymerizable functional group or a substituent having a polymerizable functional group, and at least one of $R_5$ to $R_9$ is a trifluoromethyl group.

13 Claims, 2 Drawing Sheets

CURED PRODUCT, OPTICAL ELEMENT, OPTICAL APPARATUS, AND IMAGING APPARATUS

BACKGROUND OF THE INVENTION

Field of the Invention

The present disclosure relates to a cured product for optical elements, an optical element using the cured product, an optical apparatus using the optical element, and an imaging apparatus.

Description of the Related Art

In general, the refractive index of optical materials such as glass materials and organic resins gradually increases toward the short wavelength side. The Abbe number ($v_d$), second-order dispersion characteristic ($\theta_{g,F}$), and the like are known as indices representing the wavelength dispersion of the refractive index. The Abbe number and second-order dispersion characteristic are values unique to each optical material, but in many cases, they are within a certain range. Note that the Abbe number ($v_d$: Abbe number based on the d-line) and the second-order dispersion characteristic ($\theta_{g,F}$) are expressed by the following formulas.

$$v_d = (n_d - 1)/(n_F - n_C)$$

$$\theta_{g,F} = (n_g - n_F)/(n_F - n_C)$$

$n_d$: Refractive index at wavelength 587.6 nm
$n_F$: Refractive index at wavelength 486.1 nm
$n_C$: Refractive index at wavelength 656.3 nm
$n_g$: Refractive index at wavelength 435.8 nm However, by designing the composition (such as material species and molecular structure) of optical materials (such as glass materials and organic resins) in detail, optical materials that have a high second-order dispersion characteristic outside the above range of values have also been synthesized. Also, when manufacturing an optical element with an aspherical shape excellent in chromatic aberration correction feature, the method of forming an organic resin on a spherical glass or the like has the advantage of being superior in mass productivity, moldability, freedom of shape, and light weight, rather than using a glass material as a material. However, the optical characteristic of conventional organic resins are within the above-mentioned certain range, and few of them exhibit peculiar dispersion characteristic.

Japanese Patent Application Laid-Open No. 2018-165355 discloses a cured product of a triarylamine compound in which two benzene rings and a fluorene skeleton are bonded as an optical material having a high Abbe number and a high second-order dispersion characteristic.

SUMMARY OF THE INVENTION

An aspect of the present disclosure is to provide an optical material having a higher transmittance and a higher second-order dispersion characteristic than the cured product of a triarylamine compound disclosed in Japanese Patent Application Laid-Open No. 2018-165355, and an optical element and an optical apparatus using the optical material.

An aspect of the present disclosure is a cured product of a resin composition, the resin composition comprising: a compound represented by the following formula (1)

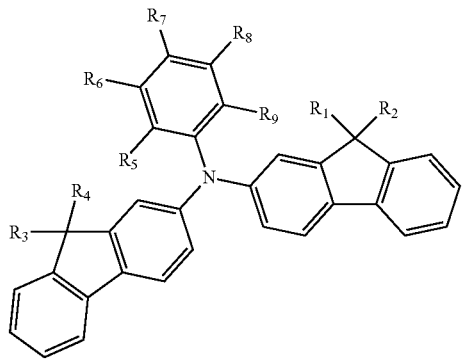

wherein $R_1$ to $R_4$ are each independently selected from the group consisting of a polymerizable functional group, a substituted or unsubstituted alkyl group having 1 to 8 carbon atoms, a substituted or unsubstituted alkyl group having 1 to 6 carbon atoms and having a polymerizable functional group at a terminal thereof, and a substituted or unsubstituted alkyl group having 2 to 6 carbon atoms and having a polymerizable functional group at a terminal thereof, in which one $CH_2$ in a main chain is replaced by an oxygen atom or a sulfur atom, $R_5$ to $R_9$ are each independently selected from a hydrogen atom and a trifluoromethyl group, and at least one of $R_1$ to $R_4$ is a polymerizable functional group or a substituent having a polymerizable functional group, and at least one of $R_5$ to $R_9$ is a trifluoromethyl group.

Further, the present disclosure provides an optical element including the cured product, and an optical apparatus and an imaging apparatus including the optical element.

Further features of the present disclosure will become apparent from the following description of exemplary embodiments with reference to the attached drawings.

DESCRIPTION OF THE EMBODIMENTS

Figure 1A:
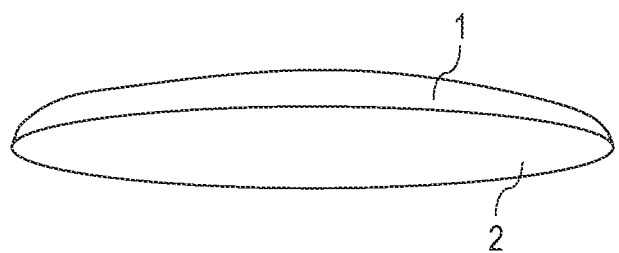
FIGS. 1A and 1B are each a cross-sectional view in the thickness direction schematically showing the structure of an exemplary optical element of the present disclosure.

As a result of intensive studies, the present inventors have found that a cured product of a resin composition containing a specific triarylamine compound exhibits a high second-order dispersion characteristic and a high transmittance. Specifically, it has been found that among the three aryl groups in the triarylamine compound, when two of the three aryl groups are fluorenyl groups and the other aryl group is a phenyl group substituted with a trifluoromethyl group, it is possible to achieve both a high second-order dispersion characteristic and a high transmittance.

Hereinafter, embodiments of the present disclosure will be described with reference to the drawings. It should be noted that the present disclosure is not limited to the following embodiments, and appropriate modifications, improvements, and the like, to the following embodiments based on the ordinary knowledge of those skilled in the art are also included in the scope of the present disclosure without departing from the gist of the present disclosure. Further, in the present disclosure, "a resin composition containing a compound represented by the following general formula (1)" is a composition that becomes a cured product by polymerization (curing) of the compound, but does not necessarily contain a resin component, a polymer component, or a macromolecule component before being cured, and also includes a composition composed only of a low-molecular-weight component.

Compound

The resin composition before curing of the cured product of the present disclosure contains a triarylamine compound represented by the following general formula (1).

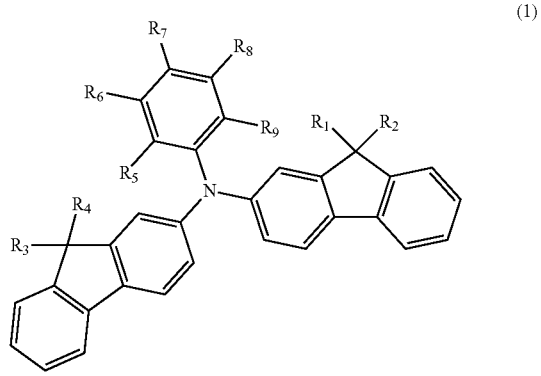

(1)

In general formula (1), $R_1$ to $R_4$ are each independently selected from a polymerizable functional group, a substituted or unsubstituted alkyl group having 1 to 8 carbon atoms, a substituted or unsubstituted alkyl group having 1 to 6 carbon atoms and having a polymerizable functional group at a terminal thereof, and a substituted or unsubstituted alkyl group having 2 to 6 carbon atoms and having a polymerizable functional group at a terminal thereof, in which one $CH_2$ in a main chain is replaced by an oxygen atom or a sulfur atom.

$R_5$ to $R_9$ are each independently selected from a hydrogen atom and a trifluoromethyl group.

However, at least one of $R_1$ to $R_4$ is a polymerizable functional group or a substituent having a polymerizable functional group, and at least one of $R_5$ to $R_9$ is a trifluoromethyl group.

In general, a compound having a long, conjugated structure typified by aromatic compounds has a smaller bandgap than a general-purpose material, so that the absorption edge in the ultraviolet region is located on the visible light region side. Due to this effect, a compound having a long, conjugated structure has a high refractive index and a high second-order dispersion characteristic. However, a practical material cannot be obtained simply by linking aromatic compounds to construct a long, conjugated structure. For example, with large aromatic compounds, disadvantages remain in terms of synthesis, coloring, decrease in transmittance on the short wavelength side of the visible light region, compatibility with other compounds, and crystal precipitation in the composition.

Therefore, in use as an optical material, it is necessary to adjust the length of the conjugated structure from the viewpoint of improving transmittance and suppressing crystal precipitation. However, shortening the conjugated structure of an aromatic compound or widening the intermolecular distance using steric hindrance of the substituents in order to improve the transmittance and suppress the crystal precipitation can lead to a decrease in refractive index and second-order dispersion characteristic.

The present inventors consider the triarylamine compound represented by the above general formula (1) according to the present disclosure as follows.

By having two fluorenyl groups in the compound, a high second-order dispersion characteristic can be obtained. Introducing a polymerizable functional group into the compound causes steric hindrance to widen the intermolecular distance, so that the crystallinity can be suppressed compared to when there is no polymerizable functional group. Moreover, the introduction of a trifluoromethyl group also causes steric hindrance, which can suppress the crystallinity. Widening the intermolecular distance by steric hindrance also leads to an improvement in transmittance. In addition, since the spread of intermolecular distance is within a small range that will not deteriorate the second-order dispersion characteristic, it is possible to maintain a high second-order dispersion characteristic, achieving both a high second-order dispersion characteristic and a high transmittance.

A triarylamine compound according to the present disclosure will be described. $R_1$ to $R_9$ in general formula (1) are as follows.

Examples of the substituted or unsubstituted alkyl group having 1 to 8 carbon atoms represented by $R_1$ to $R_4$ include, but are not limited to, methyl groups, ethyl groups, n-propyl groups, n-butyl groups, n-pentyl groups, n-hexyl groups, n-heptyl groups, n-octyl groups, iso-propyl groups, iso-butyl groups, sec-butyl groups, tert-butyl groups, iso-pentyl groups, neopentyl groups, and 2-ethylhexyl groups. An alkyl group having 1 to 6 carbon atoms is preferable in relation to second-order dispersion characteristic, and more preferably a methyl group or an ethyl group.

The substituted or unsubstituted alkyl group having 1 to 6 carbon atoms and having a polymerizable functional group at a terminal thereof represented by $R_1$ to $R_4$ is an alkyl group having 1 to 6 carbon atoms, in which the terminal H is substituted with a polymerizable functional group, and may further have a substituent in addition to the polymerizable functional group. Examples of alkyl groups having 1 to 6 carbon atoms include, but are not limited to, methyl groups, ethyl groups, n-propyl groups, iso-propyl groups, n-butyl groups, n-pentyl groups, and n-hexyl groups. A methyl group, an ethyl group, an n-propyl group, and an n-butyl group are preferable from the viewpoint of ease of synthesis.

The substituted or unsubstituted alkyl group having 2 to 6 carbon atoms and having a polymerizable functional group at a terminal thereof, in which one $CH_2$ in a main chain is replaced by an oxygen atom or a sulfur atom, represented by $R_1$ to $R_4$ is an alkyl group having 2 to 6 carbon atoms in which one $CH_2$ in a main chain is replaced by an oxygen atom or a sulfur atom and which has a skeleton having 1 to 5 carbon atoms and has a terminal substituted with a polymerizable functional group. Moreover, in addition to the polymerizable functional group, it may further have a substituent. Examples of the alkyl group include ethyl groups, n-propyl groups, iso-propyl groups, n-butyl groups, n-pentyl groups, and n-hexyl groups. From the viewpoint of ease of synthesis, a group derived by substituting one $CH_2$ in the main chain of the alkyl group with an oxygen atom is more preferable.

At least one of $R_1$ to $R_4$ is a polymerizable functional group, an alkyl group having the polymerizable functional group, or an alkyl group in which $CH_2$ of the main chain is replaced by an oxygen atom or a sulfur atom. That is, in the compound represented by general formula (1), the polymerizable functional group may be directly bonded to the fluorenyl group, or may be bonded to the fluorenyl group via an alkylene group or an alkylene group in which at least one $CH_2$ of the main chain is replaced by an oxygen atom or a sulfur atom.

Examples of the polymerizable functional group possessed by the compound represented by general formula (1) include active hydrogen groups, unsaturated polymerizable groups, and epoxy groups. The active hydrogen groups include hydroxy groups, carboxyl groups, amino groups, thiol groups, and methoxy groups, preferably hydroxy groups. The unsaturated polymerizable groups include vinyl groups, acryloyloxy groups, and methacryloyloxy groups, preferably acryloyloxy groups and methacryloyloxy groups.

In general formula (1), the number of polymerizable functional groups is preferably two or more from the viewpoint of curability, more preferably two or four from the viewpoint of ease of synthesis, and more preferably two from the viewpoint of second-order dispersion characteristic.

In addition to the polymerizable functional group, examples of substituents that may be possessed by $R_1$ to $R_4$ include methyl groups and ethyl groups.

In general formula (1), the number of trifluoromethyl groups represented by $R_5$ to $R_9$ is preferably one in the compound from the viewpoint of transmittance, and the substitution position is more preferably the para position based on the nitrogen atom, that is, $R_7$ in general formula (1) from the viewpoint of achieving both second-order dispersion characteristic and transmittance.

Preferred specific examples of the compound represented by formula (1) are shown below.

TABLE 1

| No. | Exemplary Compound |
|---|---|
| M1 | |
| M2 | |

TABLE 1-continued
| No. | Exemplary Compound |
|---|---|
| M3 | 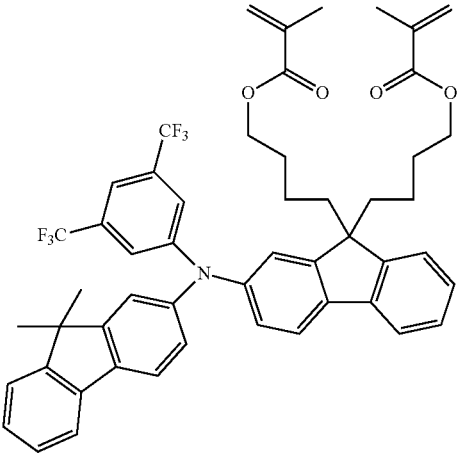 [SMILES: C=C(C)C(=O)OCCCCC1(CCCCOC(=O)C(=C)C)c2ccccc2-c2ccc(N(c3cc(C(F)(F)F)cc(C(F)(F)F)c3)c3ccc4c(c3)C(C)(C)c3ccccc3-4)cc21] |
| M4 | 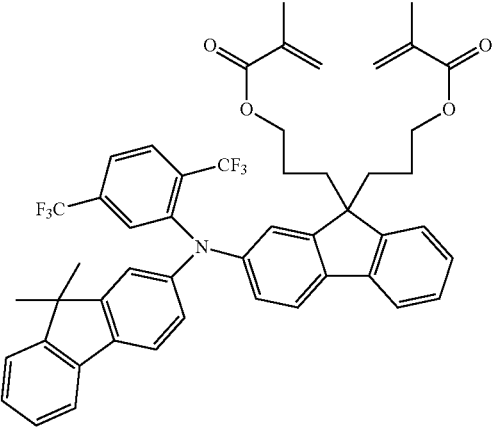 [SMILES: C=C(C)C(=O)OCCCC1(CCCOC(=O)C(=C)C)c2ccccc2-c2ccc(N(c3ccc4c(c3)C(C)(C)c3ccccc3-4)c3cc(C(F)(F)F)ccc3C(F)(F)F)cc21] |
| M5 | 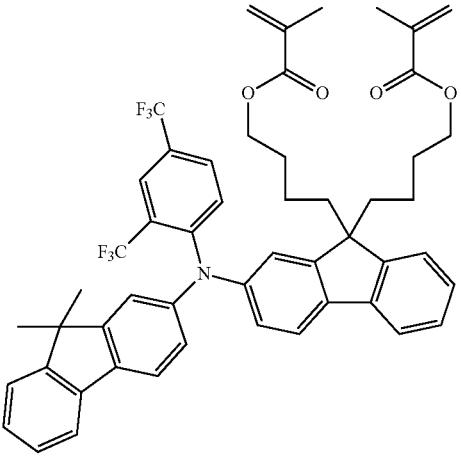 [SMILES: C=C(C)C(=O)OCCCCC1(CCCCOC(=O)C(=C)C)c2ccccc2-c2ccc(N(c3ccc4c(c3)C(C)(C)c3ccccc3-4)c3ccc(C(F)(F)F)cc3C(F)(F)F)cc21] |

TABLE 1-continued
| No. | Exemplary Compound |
|---|---|
| M6 | 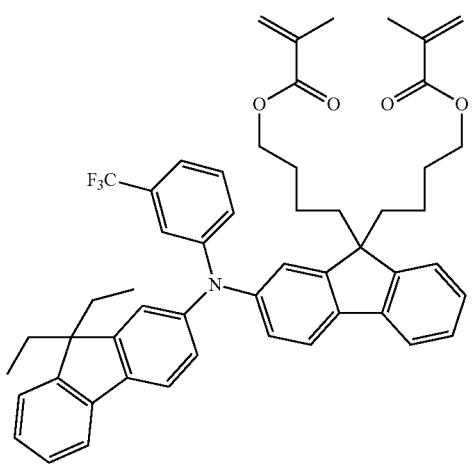 [SMILES: C=C(C)C(=O)OCCCCC1(CCCCOC(=O)C(=C)C)c2ccccc2-c2ccc(N(c3cccc(C(F)(F)F)c3)c3ccc4c(c3)C(CC)(CC)c3ccccc3-4)cc21] |
| M7 | 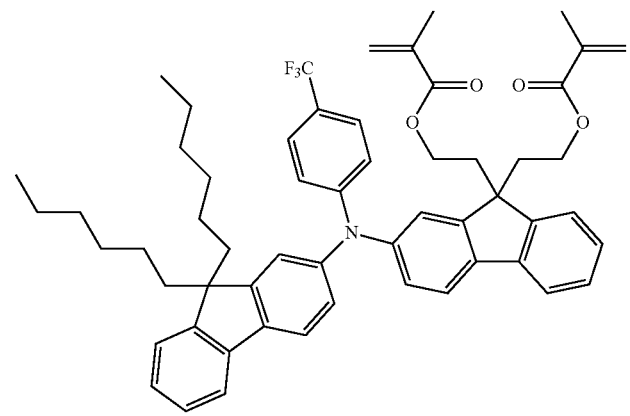 [SMILES: C=C(C)C(=O)OCCC1(CCOC(=O)C(=C)C)c2ccccc2-c2ccc(N(c3ccc(C(F)(F)F)cc3)c3ccc4c(c3)C(CCCCCC)(CCCCCC)c3ccccc3-4)cc21] |
| M8 | 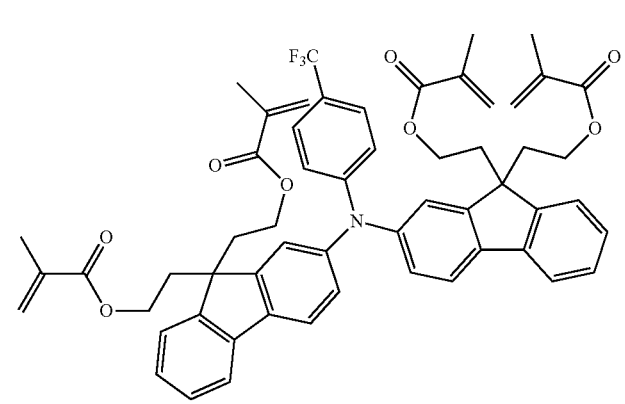 [SMILES: C=C(C)C(=O)OCCC1(CCOC(=O)C(=C)C)c2ccccc2-c2ccc(N(c3ccc(C(F)(F)F)cc3)c3ccc4c(c3)C(CCOC(=O)C(=C)C)(CCOC(=O)C(=C)C)c3ccccc3-4)cc21] |

TABLE 1-continued

| No. | Exemplary Compound |
|---|---|
| M9 | |
| M10 | |

A method of producing the compound represented by the above general formula (1) will be described with reference to examples.

The compound represented by general formula (1) can be produced by any method without particular limitation, and can be synthesized using a known synthesis method. For example, it can be synthesized using a known synthesis method described in Japanese Patent Application Laid-Open No. 2018-165355.

There are two methods of making the compound represented by general formula (1) have a polymerizable functional group. One is a method of directly introducing a polymerizable functional group so as to obtain a structure represented by general formula (1). The other is a method of introducing a structure having a polymerizable functional group or a functional group of a polymerizable functional group precursor into the precursor of the compound represented by general formula (1). As the latter method, for example, there is a method of introducing a functional group-containing aryl group using a coupling reaction involving a metal catalyst and a base based on a monoaryl amine derivative.

In order to make the compound represented by general formula (1) have an unsaturated hydrocarbon group (such as an acryl group or a methacryl group), the following methods can be used. That is, there is a method of allowing a (meth)acrylate to act on a derivative having a structure represented by general formula (1) having a hydroxy group, or a method of directly introducing an unsaturated hydrocarbon group so as to have a structure represented by general formula (1).

A metal-catalyzed coupling reaction can be selected as needed. Typical methods preferably used include the Ullmann reaction using copper, the Buchwald-Hartwig reaction using amine or the like, the Suzuki coupling using boric acid or the like, the Stille coupling using organotin, and the Negishi coupling using organozinc.

Any method can be selected for the (meth)acrylate reaction. Typical methods preferably used include a method of esterifying a hydroxyl group using (meth)acrylic halide or (meth)acrylic anhydride, and a transesterification reaction using a lower alcohol ester of (meth)acrylic acid. Preferable methods also include the direct esterification reaction in which a dehydration condensation agent such as N,N'-dicyclohexylcarbodiimide is used to dehydrate and condensate (meth)acrylic acid and the diol, and a method of heating (meth)acrylic acid and the diol in the presence of a dehydrating agent such as sulfuric acid.

Moreover, a polymerization inhibitor may be used in the resin composition containing the compound represented by general formula (1) so that polymerization does not proceed during reaction or storage of the compound. Examples that can be used include hydroquinones such as p-benzoquinone, hydroquinone, monomethyl ether of hydroquinone, and 2,5- diphenylparabenzoquinone, and N-oxy radicals such as tetramethylpiperidinyl-N-oxy radical (TEMPO). Examples also include substituted catechols such as t-butylcatechol, amines such as phenothiazine, diphenylamine, and phenyl-β-naphthylamine, nitrosobenzene, picric acid, molecular oxygen, sulfur, and copper(II) chloride. Among these, hydroquinones, phenothiazine, and N-oxy radicals are preferable in terms of versatility and polymerization inhibition, and hydroquinones are particularly preferable.

The amount of the polymerization inhibitor used has a lower limit of usually 10 ppm or more, preferably 50 ppm or more, and an upper limit of usually 10000 ppm or less, preferably 1000 ppm or less, based on the compound represented by general formula (1). At 10 ppm or more, the effect as a polymerization inhibitor becomes significant, making it possible to suppress the progress of polymerization during the reaction or concentration in the post-treatment process. Moreover, use at 10000 ppm or less reduces the risk of adverse effects such as impairing the polymerization reactivity as an impurity.

Next, the resin composition containing the compound represented by general formula (1) will be described.

The resin composition used in the present disclosure contains the compound represented by general formula (1) as well as a polymerization initiator, a polymerization inhibitor, and if necessary, a photosensitizer, a heat stabilizer, a light stabilizer, an antioxidant, a monomer component copolymerizable with the above compounds, and a resin component.

The content of the compound represented by general formula (1) contained in the resin composition is preferably 1.0% by mass or more and 99% by mass or less, more preferably 50% by mass or more and 99% by mass or less, based on the entire resin composition.

Polymerization initiators include, but are not limited to, those that generate radical species by light irradiation, those that generate cationic species, and those that generate radical species by heat.

Polymerization initiators that generate radical species by light irradiation include 2-benzyl-2-dimethylamino-1-(4-morpholinophenyl)-1-butanone and 1-hydroxy-cyclohexyl-phenylketone. Examples also include 2-hydroxy-2-methyl-1-phenyl-propan-1-one, bis(2,4,6-trimethylbenzoyl)-phenylphosphine oxide, 4-phenylbenzophenone, and 4-phenoxybenzophenone. Examples also include, but are not limited to, 4,4'-diphenylbenzophenone and 4,4'-diphenoxybenzophenone.

In addition, as polymerization initiators that generate cationic species by light irradiation, preferable polymerization initiators include, but are not limited to, iodonium(4-methylphenyl)[4-(2-methylpropyl)phenyl]-hexafluorophosphate.

Furthermore, polymerization initiators that generate radical species by heat include azo compounds such as azobisisobutyronitrile (AIBN), benzoyl peroxide, t-butyl peroxypivalate, and t-butyl peroxyneohexanoate. Examples also include, but are not limited to, peroxides such as t-hexyl peroxyneohexanoate, t-butyl peroxyneodecanoate, t-hexyl peroxyneodecanoate, and cumyl peroxyneohexanoate.

When polymerization is initiated by irradiation with ultraviolet rays or the like as light, a known sensitizer or the like can be used. Sensitizers include benzophenone, 4,4-diethylaminobenzophenone, and 1-hydroxycyclohexylphenyl ketone. Examples also include isoamyl p-dimethylaminobenzoate, methyl 4-dimethylaminobenzoate, benzoin, benzoin ethyl ether, benzoin isobutyl ether, benzoin isopropyl ether, and 2,2-diethoxyacetophenone. Examples also include, but are not limited to, methyl o-benzoylbenzoate, 2-hydroxy-2-methyl-1-phenylpropan-1-one, and acylphosphine oxide.

Note that the content ratio of the photopolymerization initiator for the polymerizable component (polymerizable component) can be appropriately selected according to the amount of light irradiation and the additional heating temperature. It can also be adjusted according to the target average molecular weight of the resulting polymer.

The content of the photopolymerization initiator used for polymerization (curing) and molding of the resin composition used in the present disclosure is preferably in the range of 0.01% by mass or more and 10.00% by mass or less based on the polymerizable component. Depending on the reactivity of the polymerizable component and the wavelength of light irradiation, only one type of photopolymerization initiator can be used, or two or more types thereof can be used in combination.

The light stabilizer is not particularly limited as long as it does not significantly affect the optical characteristics of the cured product. Typical examples include benzotriazole-based materials, such as 2-(2H-benzotriazol-2-yl)-p-cresol and 2-(2H-benzotriazol-2-yl)-4,6-bis(1-methyl-1-phenylethyl)phenol. Examples also include 2-[5-chloro(2H)-benzotriazol-2-yl]-4-methyl-6-(tert-butyl)phenol and 2-(2H-benzotriazol-2-yl)-4,6-di-tert-pentylphenol. Examples also include 2-(2H-benzotriazol-2-yl)-4-(1,1,3,3-tetramethylbutyl)phenol. Examples also include 2,2'-methyllenbis[6-(2H-benzotriazol-2-yl)-4-(1,1,3,3-tetramethylbutyl)]phenol and 2-(2H-benzotriazol-2-yl)-6-dodecyl-4-methylphenol. Examples also include cyanoacrylate materials such as ethyl 2-cyano-3,3-diphenylacrylate and 2-ethylhexyl 2-cyano-3,3-diphenylacrylate. Examples can also include triazine-based materials and benzophenone-based materials such as octabenzone and 2,2'-4,4'-tetrahydrobenzophenone. In some cases, the light stabilizer may serve as a photosensitizer, in which case it may not be added.

The content of the light stabilizer used in the polymerization (curing) and molding of the resin composition used in the present disclosure is preferably in the range of 0.01% by mass or more and 10.00% by mass or less based on the total amount of the polymerizable components.

The heat stabilizer is not particularly limited as long as it does not significantly affect the optical characteristics of the cured product. Examples of hindered phenolic materials include pentaerythritol tetrakis[3-(3,5-di-tert-butyl-4-hydroxyphenyl)]propionate. Examples also include octadecyl-3-(3,5-di-tert-butyl-4-hydroxyphenyl)propionate, benzenepropanoic acid 3,5-bis(1,1-dimethylethyl)-4-hydroxy, and C7-C9 side chain alkyl esters. Examples also include 4,6-bis(octylthiomethyl)-o-cresol, 4,6-bis(dodecylthiomethyl)-o-cresol, and ethylenebis(oxyethylene)bis[3-(5-tert-butyl-4-hydroxy-m-tolyl)]propionate. Examples also include hexamethylenebis[3-(3,5-di-tert-butyl-4-hydroxyphenyl)] propionate. It is also possible to use phosphorus-based materials such as tris(2,4-di-tert-butylphenyl)phosphite and sulfur-based materials such as dioctadecyl-3,3'-thiodipropionate.

The content of the heat stabilizer used in the polymerization (curing) and molding of the resin composition used in the present disclosure is preferably in the range of 0.01% by mass or more and 10.00% by mass or less based on the total amount of the polymerizable components.

The antioxidant is not particularly limited as long as it does not significantly affect the optical characteristics of the molded article, and typical examples thereof include hindered amine-based materials. Examples include bis(2,2,6,6- tetramethyl-4-piperidyl)sebacate. Examples also include bis (1,2,2,6,6-pentamethyl-4-piperidyl)[[3,5-bis(1,1-dimethylethyl)-4-hydroxyphenyl]methyl]butylmalonate.

The content of the antioxidant used in the polymerization (curing) and molding of the resin composition used in the present disclosure is preferably in the range of 0.01% by mass or more and 10.00% by mass or less based on the total amount of the polymerizable components.

The monomer component copolymerizable with the compound represented by general formula (1) is not particularly limited, and examples thereof include, but are not limited to, (meth)acrylate compounds such as 1,3-adamantanediol dimethacrylate, 1,3-adamantane dimethanol dimethacrylate, tricyclodecane dimethanol diacrylate, pentaerythritol tetraacrylate, propoxylated neopentyl glycol diacrylate, dipropylene glycol diacrylate, ethoxylated bisphenol A dimethacrylate, tris(2-hydroxyethyl) isocyanurate triacrylate, 2(2-ethoxy)ethyl acrylate, stearyl acrylate, tetrahydrofurfuryl acrylate, 2-phenoxyethyl acrylate, isodecyl acrylate, isobornyl acrylate, isobornyl methacrylate, 1,3-butylene glycol diacrylate, 1,4-butanediol diacrylate, diethylene glycol diacrylate, 1,6-hexanediol diacrylate, triethylene glycol diacrylate, tripropylene glycol diacrylate, dipropylene glycol diacrylate, triethylene glycol dimethacrylate, ethylene glycol dimethacrylate, tetraethylene glycol dimethacrylate, 1,4-butanediol dimethacrylate, diethylene glycol dimethacrylate, 1,6-hexanediol dimethacrylate, tripropylene glycol dimethacrylate, dipropylene glycol dimethacrylate, trimethylolpropane trimethacrylate, 9,9-bis[4-(2-acryloyloxy ethoxy)phenyl]fluorene, 9,9-bis[4-(2-methacryloyloxy ethoxy)phenyl]fluorene, 9,9-bis[4-(2-acryloyloxy)phenyl] fluorene, 9,9-bis[4-(2-methacryloyloxy)phenyl]fluorene, benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenvl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, 1,1-bis(4-acryloxyethoxyphenyl)sulfone, 1,1-bis(4-methacryloxyethoxyphenyl) sulfone, 1,1-bis(4-acryloxydiethoxyphenyl)sulfone, 1,1-bis (4-methacryloxydiethoxyphenyl)sulfone, dimethylol tricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methyl thioacrylate, methyl thiomethacrylate, phenyl thioacrylate, benzyl thiomethacrylate, xylylene dithiol diacrylate, xylylene dithiol dimethacrylate, mercaptoethyl sulfide diacrylate, and mercaptoethyl sulfide dimethacrylate, allyl compounds such as allyl glycidyl ether, diallyl phthalate, diallyl terephthalate, diallyl isophthalate, diallyl carbonate, and diethylene glycol bisallyl carbonate, vinyl compounds such as styrene, chlorostyrene, methylstyrene, bromostyrene, dibromostyrene, divinylbenzene, 3,9-divinylspirobi (m-dioxane), and diisopropenylbenzene. Acrylic compounds and methacrylic compounds are particularly preferable from the viewpoint of excellent optical characteristics and moldability.

Further, the resin composition used in the present disclosure may contain a thermoplastic resin, and examples thereof include ethylene homopolymers, random or block copolymers of ethylene with one or more α-olefins such as propylene, 1-butene, 1-pentene, 1-hexene, and 4-methyl-1-pentene, one or more random or block copolymers of ethylene with vinyl acetate, acrylic acid, methacrylic acid, methyl acrylate, and methyl methacrylate, propylene homopolymers, random or block copolymers of propylene and one or more α-olefins other than propylene such as 1-butene, I-pentene, 1-hexene, and 4-methyl-1-pentene, polyolefin resins such as 1-butene homopolymers, ionomer resins, and mixtures of these polymers; hydrocarbon atom-based resins such as petroleum resins and terpene resins: polyester-based resins such as polyethylene terephthalate, polybutylene terephthalate, and polyethylene naphthalate; polyamide resins such as nylon 6, nylon 66, nylon 11, nylon 12, nylon 610, nylon 6/66, nylon 66/610, and nylon MXD; acrylic resins such as polymethyl methacrylate; styrene and acrylonitrile-based resins such as polystyrene, styrene-acrylonitrile copolymer, styrene-acrylonitrile-butadiene copolymer, and polyacrylonitrile: polyvinyl alcohol-based resins such as polyvinyl alcohol and ethylene-vinyl alcohol copolymer; polycarbonate resin; polyketone resin; polymethylene oxide resin; polysulfone resin; polyimide resin; and polyamide imide resin. These can be used alone or in combination of two or more kinds.

The content of the monomer component and the resin component contained in the resin composition is 0.01% by mass or more and 99% by mass or less. Considering the refractive index characteristics and brittleness of the cured product obtained from the resin composition, the content is desirably 0.01% by mass or more and 50% by mass or less. Furthermore, in order to maintain the second-order dispersion characteristic and transmittance, it is more preferable to contain at least one of an acrylic compound and a methacrylic compound as a copolymerization component based on the compound represented by general formula (1) in a range of 0.01 or more and 0.20 or less in mass ratio.

Optical Element

Next, the optical element of the present disclosure will be described with reference to the drawings.

The optical element of the present disclosure is characterized by having a cured product of a polymer of resin compositions containing the compound represented by general formula (1). The cured product according to the present disclosure exhibits a high second-order dispersion characteristic of 0.80 or more, so that chromatic aberration can be efficiently removed in the optical element of the present disclosure.

Figure 1B:
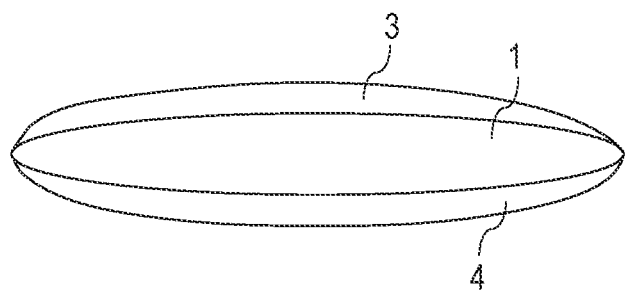

FIGS. 1A and 1B each show a schematic cross-sectional view in the thickness direction in an embodiment of the optical element of the present disclosure. In FIG. 1A, a thin film of the cured product 1 is provided on one surface of the transparent substrate 2.

Transparent resin or transparent glass can be used for the transparent substrate 2. Here, in the present specification, the term "transparent" means that the transmittance of the entire range of visible light (light having a wavelength in the range of 380 nm or more and 780 nm or less) is 30% or more. For the transparent substrate 2, glass is preferably used, such as general optical glass typified by silicate glass, borosilicate glass, and phosphate glass, as well as quartz glass and glass ceramics. It is preferable that the transparent substrate 2 has a circular shape when viewed from above.

As a method for producing the optical element of FIG. 1A, for example, a method of forming a thin layer structure on a transparent substrate is employed. Specifically, a mold made of metal material is provided at a certain distance from the transparent substrate 2, and the space between the mold and the transparent base material 2 is filled with a resin composition having fluidity, which is then lightly pressed to form a mold. Then, if necessary, the resin composition is polymerized while maintaining that state.

Light irradiation for such a polymerization reaction is carried out using light of a suitable wavelength, usually ultraviolet light or visible light, corresponding to the mechanism resulting from radical generation using a photopolymerization initiator. For example, the raw material such as a monomer of the resin composition is uniformly irradiated with light through a light-transmissive material used as the transparent base material 2. The amount of irradiation light is appropriately selected according to the mechanism resulting from radical generation using the photopolymerization initiator and the content ratio of the photopolymerization initiator contained.

On the other hand, in curing the resin composition by such a photopolymerization reaction, it is more preferable that the entire molded resin composition is uniformly irradiated with light. Therefore, it is more preferable to select light having a wavelength that enables uniform irradiation with light through the light-transmitting material used for the transparent substrate 2. Here, it is more suitable for the present disclosure to reduce the thickness of the cured product 1 formed on the transparent substrate 2.

In FIG. 1B, a thin film of the cured product 1 obtained by curing the resin composition is sandwiched between the first transparent substrate 3 and the second transparent substrate 4. In FIG. 1B, the transparent substrates 3 and 4 have concave surfaces on the opposing sides thereof and are in contact with each other at the outer peripheries thereof, and the cured product 1 has a lens shape with convex surfaces on both sides. Transparent resin or transparent glass can be used for the transparent substrates 3 and 4, preferably glass. As the glass, general optical glass represented by silicate glass, borosilicate glass, and phosphate glass, as well as quartz glass and glass ceramics can be used. It is preferable that the transparent substrates 3 and 4 have a circular shape when viewed from above.

As a method for producing the optical element of in FIG. 1B, for example, the resin composition is poured between the transparent substrates 3 and 4 and pressed lightly to perform molding. Then, while maintaining this state, the resin composition is photopolymerized. This makes it possible to obtain a laminate in which the cured product 1 is sandwiched between the transparent substrates 3 and 4.

Similarly, the cured product 1 can also be produced by the thermal polymerization method. In this case, it is desirable to uniform the temperature of the whole, and it is more suitable for the present disclosure to reduce the total thickness of the cured product of the resin composition formed on a substrate of light-transmitting material. Further, in the case of increasing the total thickness of the cured product of the resin composition to be formed, it is necessary to select the irradiation amount, irradiation intensity, light source, and the like, taking account of the film thickness and the absorption of each component.

Optical Apparatus

A specific application example of the optical element of the present disclosure will be described. Specific application examples include lenses constituting optical apparatus (photographing optical systems) for cameras and video cameras and lenses constituting optical apparatus (projection optical systems) for liquid crystal projectors. It can also be used as a pickup lens for a DVD recorder or the like. These optical systems are composed of at least one lens arranged in the housing, at least one of which can be the optical element described above.

Imaging Apparatus

Figure 2:
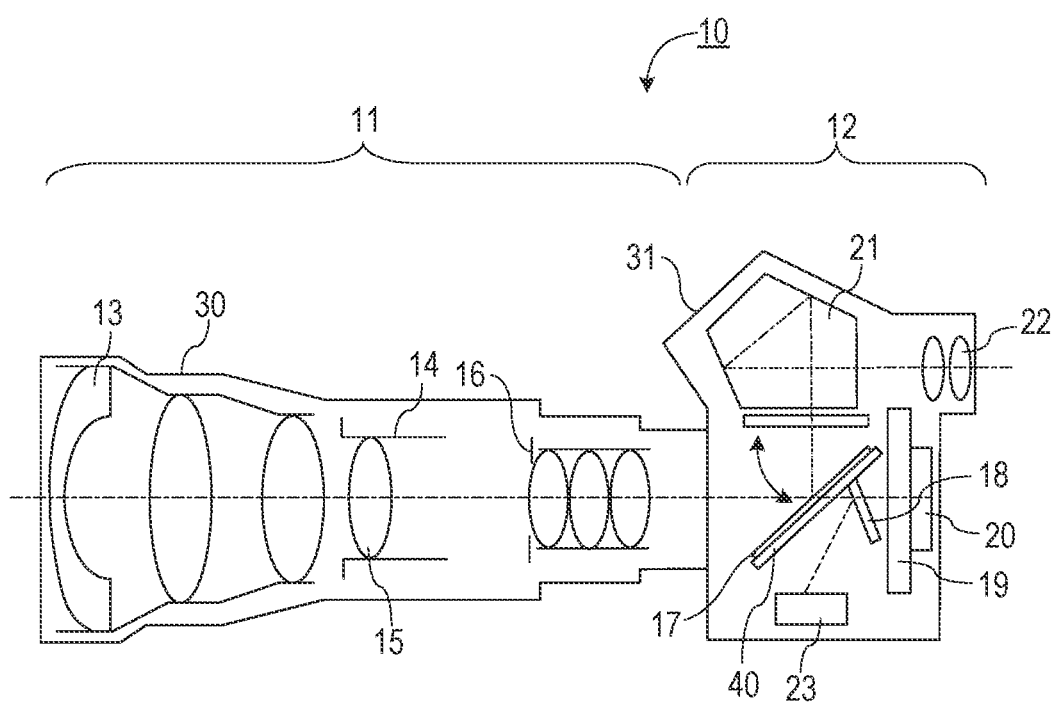
FIG. 2 is a cross-sectional view schematically showing the configuration of an imaging apparatus using the optical element of the present disclosure.

FIG. 2 is an example of a preferable embodiment of an imaging apparatus using the optical element of the present disclosure, showing the configuration of a single-lens reflex digital camera 10. FIG. 2 is a schematic cross-sectional view including the optical axis of the optical element used. In FIG. 2, a camera body 12 and a lens barrel 11, which is an optical apparatus, are coupled, and the lens barrel 11 is a so-called interchangeable lens that can be attached to and detached from the camera body 12.

Light from a subject is photographed through an optical system including a plurality of lenses 13 and 15 and the like arranged on the optical axis of the photographing optical system within a housing 30 of the lens barrel 11. The optical element of the present disclosure can be used for the lenses 13 and 15, for example. Here, the lens 15 is supported by the inner cylinder 14 and is movably supported with respect to the outer cylinder of the lens barrel 11 for focusing and zooming.

During an observation period before photographing, the light from the subject is reflected by the main mirror 17 in the housing 31 of the camera body, passes through the prism 21, and then through the finder lens 22 to show the photographed image to the photographer. The main mirror 17 is, for example, a half mirror, and light transmitted through the main mirror is reflected by a sub-mirror 18 toward an autofocus (AF) unit 23, and this reflected light is used for distance measurement, for example. The main mirror 17 is attached and supported by a main mirror holder 40 by adhesion or the like. During photographing, a not-shown drive mechanism moves the main mirror 17 and the sub-mirror 18 out of the optical path to open the shutter 19, and the imaging device 20 receives the light that has entered the lens barrel 11 and passed through the photographing optical system to form a photographic light image. Further, the diaphragm 16 is configured to change the aperture area to change the brightness and the depth of focus at the time of photographing.

Here, the imaging apparatus is described using a single-lens reflex digital camera, but the optical element of the present disclosure can be similarly used in mobile devices such as smartphones and tablets, compact digital cameras, and the like.

EXAMPLES

The present disclosure will be described in more detail below with reference to Examples, but the present disclosure is not limited by the following Examples as long as it does not depart from the gist of the disclosure. The analysis of the synthesized products was performed using an NMR apparatus ("JNM-ECA400" (trade name) manufactured by JEOL Ltd.).

Synthesis Example 1: Exemplary Compound M1

(1) Synthesis of Intermediate A

The following ingredients were put into a 500 mL three-necked flask under a nitrogen atmosphere to form a mixture.

| | |
|---|---|
| 2-Aminofluorene | 10.0 g |
| 2-Iodo-9,9-dimethylfluorene | 17.66 g |
| 4-Bromobenzotrifluoride | 12.42 g |
| Sodium tert-butoxide | 21.21 g |
| Bis(dibenzylideneacetone)palladium | 0.32 g |
| 2-Dicyclohexylphosphino-2',4',6'-triisopropylbiphenyl | 0.53 g |
| Ortho xylene | 350 mL |

The mixture was heated to 120° C. and stirred at that temperature for 6 hours. After allowing to cool to 25° C., the organic phase was extracted with ethyl acetate. The resulting organic phase was washed with saturated saline and water in this order and dried over anhydrous magnesium sulfate. The resulting crude product was purified by column chromatography to obtain 16.0 g of intermediate A (yield 62%).

(2) Synthesis of Intermediate B

Under a nitrogen atmosphere, 15.0 g of intermediate A obtained in the above (1) and 160 mL of N,N-dimethylacetamide were placed in a 500 mL three-necked flask and stirred. Then, 9.7 g of sodium tert-butoxide was added, cooled to 5° C., and a solution of 14.5 g of 4-bromobutyl acetate dissolved in 40 mL of N,N-dimethylacetamide was added dropwise over 30 minutes. After the dropwise addition, the temperature was raised to 20° C., and the mixture was stirred at that temperature (20° C.) for 20 hours. After the stirring, the mixture was cooled to 5° C., then 4.7 g of sodium methoxide was added, and the temperature was gradually raised to 20° C. After the temperature was raised, the mixture was stirred at that temperature (20° C.) for 10 hours. After the stirring, the reaction solution was poured into ice water, and the organic layer was extracted with toluene. The resulting organic phase was washed with saturated saline and water in this order and dried over anhydrous magnesium sulfate. The resulting crude product was purified by column chromatography to obtain 10.6 g of intermediate B (yield 55%).

(3) Synthesis of M1

Under a nitrogen atmosphere, into a 500 mL three-necked flask, 8.0 g of intermediate B obtained in the above (2), 350 mL of tetrahydrofuran, 0.09 g of monomethyl ether of hydroquinone (MEHQ), 0.02 g of 4-dimethylaminopyridine, and 8.5 mL of triethylamine were added and then cooled to 10° C. After that, 7.5 g of methacrylic anhydride was added dropwise, and the temperature was gradually raised to 20° C. After the temperature was raised, the mixture was stirred at that temperature (20° C.) for 10 hours. The reaction solution was diluted with toluene, and the resulting organic phase was washed with acidic and basic aqueous solutions, and then the organic phase was dried with saturated saline and anhydrous magnesium sulfate. The crude product obtained by removing the solvent was purified by silica gel chromatography to obtain 7.3 g (yield 75%) of exemplary compound M1 listed in Table 1.

Example 1

(1) Measurement of Second-Order Dispersion Characteristic ($\theta_{g,F}$)

The resin composition was placed on a high refractive glass ("S-TIH11" manufactured by HOYA) with a thickness of 1 mm. The resin composition contains 4 g of the exemplary compound M1 synthesized in Synthesis Example 1 above, 0.2 g of copolymerization component 1 (1,6-hexanediol methacrylate, manufactured by Tokyo Chemical Industry Co., Ltd.), 0.001 g of a polymerization inhibitor (manufactured by FUJIFILM Wako Pure Chemical Corporation, methoxyphenol), 0.015 g of a polymerization initiator (manufactured by Tokyo Chemical Industry Co., Ltd., diphenyl(2,4,6-trimethylbenzoyl)phosphine oxide), and the like. Next, the quartz glass was placed on the resin composition to be measured, and spread through spacers so as to have a thickness of 500 µm. The resin composition sandwiched between the two glass substrates was cured by irradiating the sample with a high-pressure mercury lamp ("EX250" manufactured by HOYA-SCHOTT Corporation) equipped with a short wavelength cut filter (UV: 385 nm) as a light source. After the curing, heat treatment was performed at 100° C. for 12 hours in order to complete the reaction, and a measurement sample was produced. The refractive index of the measurement sample was measured using an Abbe refractometer (manufactured by Kalnew Optical Industry), and the second-order dispersion characteristic ($\theta_{g,F}$) was calculated from the refractive index and evaluated according to the following criteria. Note that the glass substrate used had a higher refractive index than that of the cured product of the resin composition. Table 2 shows the evaluation results. Evaluation criteria are as follows.

A: 0.84 or more
B: 0.82 or more and less than 0.84
C: 0.80 or more and less than 0.82

(2) Measurement of Transmittance

A transmittance measurement sample with a thickness of 500 µm and a transmittance measurement sample with a thickness of 1000 µm were prepared in the same manner as in the measurement of second-order dispersion characteristics described above. Note that the 500 µm-thick transmittance measurement sample may be the refractive index measurement sample prepared for the measurement of second-order dispersion characteristic described above. The transmittance of the transmittance measurement sample of each film thickness was measured with a spectrophotometer ("U-4000" (trade name) manufactured by Hitachi High-Technologies Corporation), and was converted into internal transmittance (1000 µm) at a wavelength of 450 nm and evaluated according to the following criteria. Table 2 shows the evaluation results. Evaluation criteria are as follows.

A: 98% or more
B: 97% or more and less than 98%
C: 96% or more and less than 97%

Examples 2 to 10

Measurement samples were prepared in the same manner as in Example 1, and the secondary dispersion characteristics ($\theta_{g,F}$) and transmittances were measured except for changing the exemplary compounds, the types of copolymerization components, and the mass ratios of the exemplary compounds and the copolymerization components as shown in Table 2. Table 2 shows the evaluation results.

Copolymerization component 2: triethylene glycol dimethacrylate (manufactured by Tokyo Chemical Industry Co., Ltd.)

Copolymerization component 3: tricyclodecane dimethanol diacrylate (manufactured by Shin-Nakamura Chemical Co., Ltd.)

Comparative Example 1

A resin composition was prepared in the same manner as in Example 1 except that exemplary compound M1 was changed to comparative example compound R1 below, but comparative example compound R1 was precipitated without being compatible with other components, so that the second-order dispersion characteristic ($\theta_{g,F}$) and transmittance were not measured.

Comparative Example Compound R1

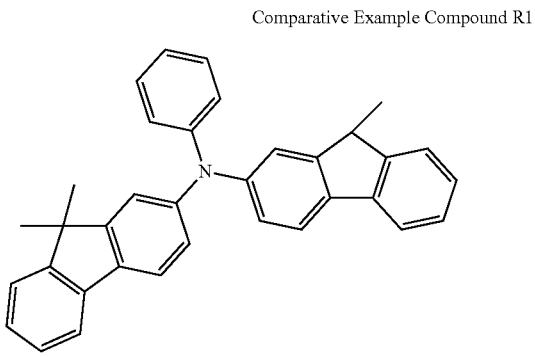 [SMILES: CC1c2ccccc2-c2ccc(N(c3ccccc3)c3ccc4c(c3)C(C)(C)c3ccccc3-4)cc21]

Furthermore, in the compound represented by general formula (1), it is seen that a trifluoromethyl group is bonded to the position of R; in general formula (1), so that it is possible to obtain both a higher second-order dispersion characteristic and a higher transmittance.

From the above, it was found that the cured product of the resin composition containing the compound represented by general formula (1) had a high second-order dispersion characteristic ($\theta_{g,F}$) and a high transmittance.

The present disclosure makes it possible to provide an optical element that contains a cured product having a high refractive index second-order dispersion characteristic ($\theta_{g,F}$), that is, having a high chromatic aberration correction feature and a high transmittance.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-002279, filed Jan. 11, 2022, which is hereby incorporated by reference herein in its entirety.

TABLE 2

| Exemplary Compound | Copolymerization Component | Copolymerization Component/ Exemplary Compound (Mass Ratio) | Refractive Index $\theta_{g,F}$ | Evaluation | Transmittance 450 nm | Evaluation |
|---|---|---|---|---|---|---|
| Example 1 | M1 | 1 | 0.05 | 0.86 | A | 98.4 | A |
| Example 2 | M2 | 1 | 0.05 | 0.84 | A | 97.6 | B |
| Example 3 | M4 | 1 | 0.10 | 0.82 | B | 96.3 | C |
| Example 4 | M5 | 1 | 0.10 | 0.83 | B | 96.9 | C |
| Example 5 | M6 | 2 | 0.10 | 0.84 | A | 97.8 | B |
| Example 6 | M7 | 2 | 0.10 | 0.85 | A | 98.2 | A |
| Example 7 | M8 | 3 | 0.10 | 0.81 | C | 97.7 | B |
| Example 8 | M9 | 3 | 0.15 | 0.84 | A | 98.1 | A |
| Example 9 | M1 | 1 | 0.20 | 0.83 | B | 97.8 | B |
| Example 10 | M1 | 1 | 0.30 | 0.81 | C | 97.1 | B |

As shown in Table 2, the cured products of Examples 1 to 10 all had a second-order dispersion characteristic of 0.80 or more, and exhibited a high transmittance of 96% or more for light with a wavelength of 450 nm. Meanwhile, in the resin composition of Comparative Example 1, the comparative example compound R1 had a high crystallinity and was incompatible with other components, so that the second-order dispersion characteristic and transmittance could not be evaluated. Examples 1, 2, and 5 to 10 had a higher transmittance for light with a wavelength of 450 nm than Examples 3 and 4. This is probably because the compound represented by general formula (1) in the resin compositions of Examples 3 and 4 has two trifluoromethyl groups.

In addition, Examples 1 to 6, 8, and 9 exhibited higher second-order dispersion characteristics than Examples 7 and 10. This is probably because the compound represented by general formula (1) in the resin composition of Example 7 has four polymerizable functional groups, and the mass ratio of the copolymerization component to the compound represented by formula (1) in Example 10 was 0.30. That is, it is seen that there are two polymerizable functional groups, and the mass ratio of the copolymerization component to the compound represented by general formula (1) is 0.01 or more and 0.20 or less, so that it is possible to obtain a high second-order dispersion characteristic and a high transmittance.

What is claimed is:

1. A cured product of a resin composition, the resin composition comprising: a compound represented by the following formula (1)

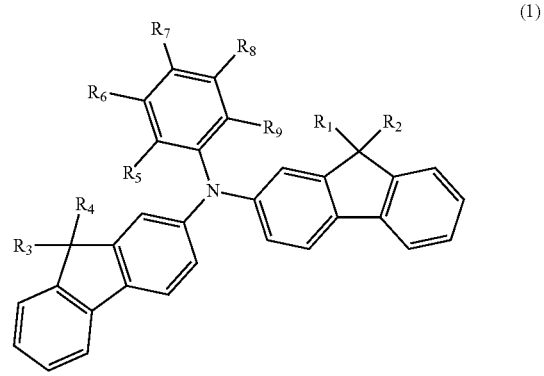

(1)

wherein $R_1$ to $R_5$ are each independently selected from the group consisting of a polymerizable functional group, a substituted or unsubstituted alkyl group having 1 to 8 carbon atoms, a substituted or unsubstituted alkyl group having 1 to 6 carbon atoms and having a polymerizable functional group at a terminal thereof, and a substituted or unsubstituted alkyl group having 2 to 6 carbon atoms and having a polymerizable functional group at a terminal thereof, in which one $CH_2$ in a main chain is replaced by an oxygen atom or a sulfur atom, $R_5$ to $R_9$ are each independently selected from a hydrogen atom and a trifluoromethyl group, and at least one of $R_1$ to $R_4$ is a polymerizable functional group or a substituent having a polymerizable functional group, and at least one of $R_5$ to $R_9$ is a trifluoromethyl group.

2. The cured product according to claim 1, wherein the polymerizable functional group is an acryloyloxy group or a methacryloyloxy group.

3. The cured product according to claim 1, wherein the compound has two polymerizable functional groups.

4. The cured product according to claim 1, wherein the compound has one or two trifluoromethyl groups.

5. The cured product according to claim 4, wherein the compound has one trifluoromethyl group and $R_7$ is the trifluoromethyl group.

6. The cured product according to claim 1, wherein the resin composition contains at least one compound selected from the group consisting of an acrylic compound and a methacrylic compound copolymerizable with the compound represented by the formula (1).

7. The cured product according to claim 6, wherein a mass ratio of the acrylic compound and the methacrylic compound relative to the compound represented by the formula (1) in the resin composition is in a range of 0.01 or more and 0.20 or less.

8. An optical element comprising the cured product according to claim 1.

9. The optical element according to claim 8, further comprising a transparent substrate, wherein the cured product is arranged on the transparent substrate.

10. The optical element according to claim 8, further comprising a first transparent substrate and a second transparent substrate, wherein the cured product is sandwiched between the first transparent substrate and the second transparent substrate.

11. An optical apparatus comprising: a housing, and an optical system that includes at least one lens arranged in the housing, wherein the at least one lens is the optical element according to claim 8.

12. An imaging apparatus comprising: a housing; an optical system that includes at least one lens arranged in the housing; and an image pickup device that receives light having passed through the optical system, wherein the at least one lens is the optical element according to claim 8.

13. The imaging apparatus according to claim 12, wherein the imaging apparatus is a camera.

* * * * *